US005604878A

United States Patent [19]
Colwell et al.

[11] Patent Number: 5,604,878
[45] Date of Patent: Feb. 18, 1997

[54] METHOD AND APPARATUS FOR AVOIDING WRITEBACK CONFLICTS BETWEEN EXECUTION UNITS SHARING A COMMON WRITEBACK PATH

[75] Inventors: Robert P. Colwell, Portland; Michael A. Fetterman; Andrew F. Glew, both of Hillsboro; Glenn J. Hinton, Portland; Robert W. Martell, Hillsboro; David B. Papworth, Beaverton, all of Oreg.

[73] Assignee: Intel Corporation, Santa Clara, Calif.

[21] Appl. No.: 513,679

[22] Filed: Aug. 1, 1995

Related U.S. Application Data

[63] Continuation of Ser. No. 202,945, Feb. 28, 1994, abandoned.

[51] Int. Cl.[6] .................. G06F 9/38; G06F 13/00
[52] U.S. Cl. .................. 395/393; 395/800; 395/826; 395/427; 364/281.3; 364/281.8; 364/231.8; 364/948.34; 364/964.26
[58] Field of Search ..................... 395/800, 496, 395/725, 775, 427, 375; 364/DIG. 1, DIG. 2, 281.3, 281.8, 231.8, 948.34, 964.26

[56] References Cited

U.S. PATENT DOCUMENTS

| | | | |
|---|---|---|---|
| 4,875,161 | 10/1989 | Lahti | 364/200 |
| 5,067,069 | 11/1991 | Fite et al. | 395/375 |
| 5,073,855 | 12/1991 | Staplin et al. | 395/375 |
| 5,081,575 | 1/1992 | Hiller et al. | 395/325 |
| 5,165,038 | 11/1992 | Beard et al. | 395/800 |
| 5,222,223 | 6/1993 | Webb Jr. et al. | 395/425 |
| 5,222,240 | 6/1993 | Patel | 395/775 |

OTHER PUBLICATIONS

Hennessy & Patterson, *Computer Architecture A Quantitative Approach* Morgan Kaufmann Publishers, Inc., San Mateo CA pp. 250–349 [1990].

*Primary Examiner*—Wayne Amsbury
*Assistant Examiner*—Valerie Darbe
*Attorney, Agent, or Firm*—Blakely, Sokoloff, Taylor & Zafman

[57] ABSTRACT

Pipeline lengthening in functional units likely to be involved in a writeback conflict is implemented to avoid conflicts. Logic circuitry is provided for comparing the depths of two concurrently executing execution unit pipelines to determine if a conflict will develop. When it appears that two execution units will attempt to write back at the same time, the execution unit having a shorter pipeline will be instructed to add a stage to its pipeline, storing its result in a delaying buffer for one clock cycle. After the conflict has been resolved, the instruction to lengthen the pipeline of a given functional unit will be rescinded. Multistage execution units are designed to signal a reservation station to delay the dispatch of various instructions to avoid conflicts between execution units.

24 Claims, 4 Drawing Sheets

METHOD AND APPARATUS FOR AVOIDING WRITEBACK CONFLICTS BETWEEN EXECUTION UNITS SHARING A COMMON WRITEBACK PATH

This is a continuation of application Ser. No. 08/202,945, filed Feb. 28, 1994, now abandoned.

BACKGROUND OF THE INVENTION

1. Field of the Invention

The present invention relates to the field of microprocessor architecture. More specifically, the present invention relates to the field of microprocessor architecture for coordinating instructions executed in parallel which require common resources by providing a method and apparatus for extending execution unit pipelines.

2. Art Background

As the computer revolution has progressed the quest of microprocessor developers has been to develop chips exhibiting more power and faster performance. Initial efforts focused essentially on increasing transistor populations on single microprocessor integrated circuits. That effort continues with today's microprocessors now housing literally millions of transistors on a single chip. Further integration has allowed processor clock speeds to be greatly increased with the increased density of transistors.

In addition to squeezing performance by overcoming physical limitations, microprocessor design has developed into an art form. Microprocessors are divided into discrete functional blocks through which instructions are propagated one stage at a time. This allows for pipelining of instructions such that when one instruction has completed the first stage of processing and moves on to the second stage, a second instruction may begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems.

Other enhancements to microprocessor design include the development of superscalar microprocessors which are capable of launching more than one instruction at the initial stage of the pipeline per clock cycle. Likewise, in a superscalar microprocessor, frequently more than one instruction completes on each given clock cycle. Other development efforts have gone into the simplification of microprocessor instruction sets, developing reduced instruction set (RISC) microprocessors which exploit the fact that many simple instructions are more commonly executed than some complicated instructions. Eliminating the complicated instructions from the instruction set provides for a faster executing pipeline. Complicated instructions are carried out by combinations of the more simple instructions.

In order for pipelined microprocessors to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instruction until the condition is resolved. Since the condition will not be resolved until further down the pipeline, the instruction fetch unit may not be able to fetch proper instructions.

To overcome this problem, many pipelined microprocessors use branch prediction mechanisms that predict the outcome of branches and then fetch subsequent instructions according to branch prediction. Branch prediction is achieved using a branch target buffer to store the history of a branch instruction based upon the instruction pointer or address of that instruction. Every time a branch instruction is fetched, the branch target buffer predicts the target address of the branch using the branch history. The use of branch prediction in a pipelined instruction architecture is often referred to as speculative execution.

In addition to speculative execution, substantial increases in instruction throughput are achievable by implementing out-of-order dispatch of instructions to the execution units. Many experiments have confirmed that typical von Neumann code provides substantial parallelism and hence a potential performance boost by use of out-of-order execution. Out-of-order execution is possible when a given instruction does not depend on previous instructions for a result before executing. With out-of-order execution, any number of instructions are allowed to be in execution in the execution units, up to the total number of pipeline stages for all the functional units.

In a processor using out-of-order execution, instruction issuing is stalled when there is a conflict for a functional unit or when an issued instruction depends on the result of an instruction that is not yet computed. In order to prevent or mitigate stalls in decoding, previous texts have described the provision of a buffer known as a reservation station (RS) between the decode and execute stages. The processor decodes instructions and places them into the reservation station as long as there is room in the buffer and at the same time examines instructions in the reservation station to find those that can be dispatched to the execution units (that is, instructions for which source operands and execution units are available). Data-ready instructions are issued from the reservation station with little regard for their original program order. For a further description of the use of a reservation station and out-of-order execution, see Mike Johnson, *Superscalar Microprocessor Design* and Prentice-Hall, Inc., 1991, Chapters 3 and 7.

In microprocessors implementing reservation stations, including superscalar processors, the reservation station will generally provide ready instructions directly from the reservation station to an appropriate execution unit. In many cases execution units may be grouped together coupled from a single dispatch port from the reservation station. For example, one implementation may have floating point add and floating point multiply execution units coupled through the same dispatch port. Floating point add and floating point multiply execution units may have differing length internal pipelines. A problem arises because these commonly grouped execution units may share a single writeback path from the execution units. If the reservation station dispatches a first instruction to an execution unit such as to the floating point multiply unit and then subsequently dispatches an instruction to the floating point add execution unit in a common group of execution units, it is possible that multiple execution units will be ready to write back a result at the same time. Because the execution units share a common writeback port, a contention develops.

It is an object of the present invention to overcome the contention of execution units which share a common writeback port and which face this contention possibility.

SUMMARY OF THE INVENTION

From the foregoing it can be appreciated that there is a need to provide a means for overcoming contentions between execution units which share a common writeback path and which may require simultaneous access to the writeback path. Therefore, it is an object of the present invention to provide a means for changing the internal pipeline length of an execution unit which may be involved in a writeback contention with another execution unit on a shared writeback port.

It is also an object of the present invention to be able to detect potential conflicts on a shared writeback port between multiple functional units.

It is another object of the present invention to provide a means of inhibiting or delaying a reservation station from dispatching instructions which may lead to writeback conflicts.

These and other objects of the present invention are provided by a means and method for lengthening the pipeline of functional units that would otherwise be involved in a writeback conflict. Logic circuitry is provided for comparing the depths of two concurrently executing execution unit pipelines to determine if a conflict will develop. When it appears that two execution units will attempt to write back at the same time, the execution unit having a shorter pipeline will be instructed to add a stage to its pipeline, storing its result in an added register for one clock cycle. After the conflict has been resolved, the instruction to lengthen the pipeline of a given functional unit will be rescinded.

The present invention also provides for a means and method for multi-stage execution units to signal the reservation station to delay the dispatch of various instructions to avoid conflicts between those execution units. For example, a three-stage pipeline execution unit will signal the reservation station not to dispatch any single-cycle instructions that will need to be written back concurrently over a common write-back port. Likewise, execution units requiring an undetermined number of pipeline stages are equipped with means for signaling the reservation station to inhibit dispatch of instructions to execution units sharing a common writeback report a known number of cycles in advance to avoid contentions.

BRIEF DESCRIPTION OF THE DRAWINGS

The objects, features and advantages of the present invention will be apparent from the following detailed description in which.

DETAILED DESCRIPTION

The present invention provides a method and apparatus for avoiding writeback conflicts between execution units sharing a common writeback port. In the following description numerous specific details are set forth, such as particular execution unit pipeline lengths and instruction codes, in order to provide a thorough understanding of the present invention. It will be appreciated, however, by one skilled in the art that the present invention may be practiced without such specific details. In other instances, well known control structures and gate level circuits have not been shown in detail in order not to obscure the present invention. Particularly, many functions are described to be carried out by various logic circuits. Those of ordinary skill in the art, having been described the various functions, will be able to implement the necessary logic circuits without undue experimentation.

Figure 1:
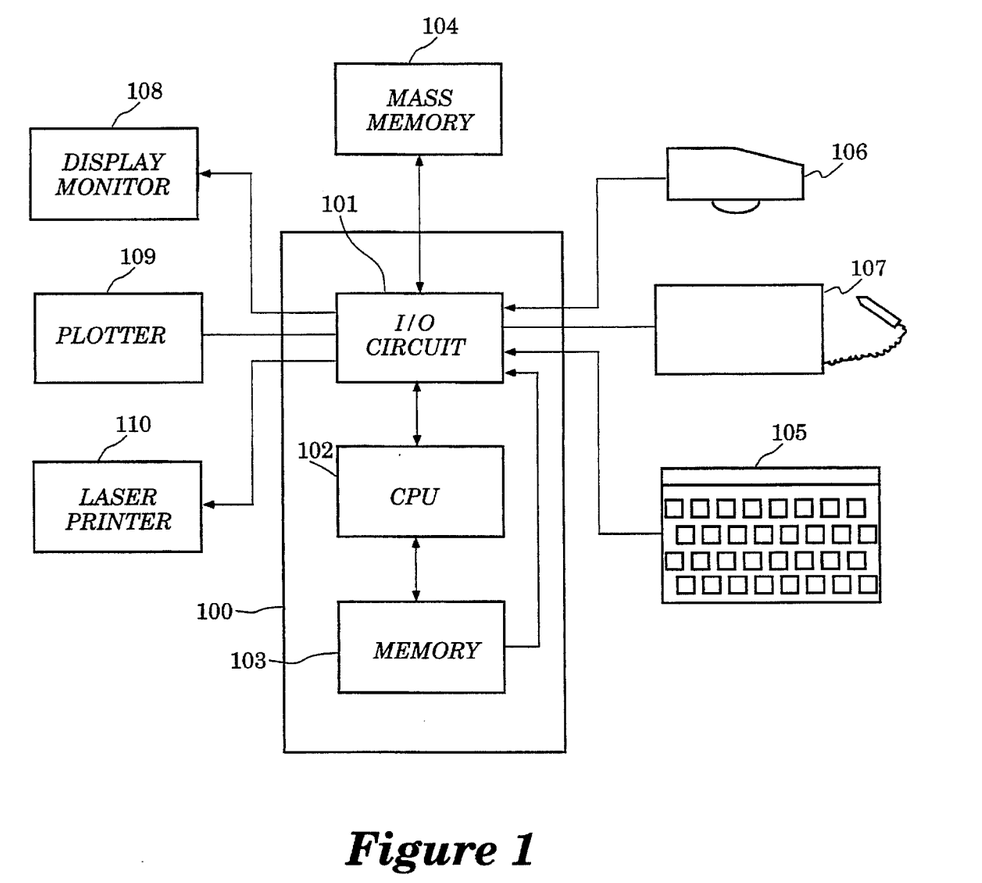
FIG. 1 illustrates a basic computer architecture which may incorporate the present invention.

Referring first to FIG. 1, a typical computer system which may utilize a microprocessor that implements the present invention is shown. As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor. Many commercially available computers having differing capabilities may be utilized with a processor incorporating the present invention.

Also shown in FIG. 1 is an input device 105, shown in a typical embodiment as a keyboard. There is also shown as an input device a graphics tablet 107. It should be understood, however, that the input device may actually be in any other well-known input device (including, of course, another computer). A mass memory device 104 is coupled to I/O circuit 101 and provides additional storage capabilities for the computer 100. The mass memory may include other programs, fonts for different characters and the like and may take the form of magnetic or optical disc drive or any other well-known device. It will be appreciated that the data retained within mass memory 104, may, in appropriate cases, be incorporated in standard fashion into computer 100 as part of memory 103.

In addition, three typical computer display devices are illustrated, the display monitor 108, the plotter 109 and a laser printer 110. Each can be used to display images or documents or other data utilized by the computer 100. A cursor control device 106, such as a mouse, trackball or stylus are also coupled to I/O circuit 101. Other pointing devices may suitably be used as appropriate.

The preferred embodiment of the present invention is intended to be implemented in a microprocessor that executes the well-known Intel Architecture Microprocessor instruction set. The present invention may, however, be implemented in any microprocessor having a microarchitecture in which a plurality of functional units share a common writeback path and which may face the contention of multiple functional units simultaneously needing to write back over the common writeback path.

The microprocessor of the present invention, prior to executing Intel Architecture Microprocessor instructions, decodes them into a more simple, stylized sequence of "micro operations." The micro operations are then analyzed and rescheduled according to resolved dependencies thus implementing out-of-order execution. The sequence below shows the mapping of six instructions of the Dhrystone trace into their constituent micro operations ("Gn" is general register n):

| Intel Architecture Instructions | micro operations |
| --- | --- |
| 000014e8: PUSHw BP <TOS fbfffc3c> | STw IN (G5, G4) OUT (Memfbfffc3c) |
|  | SUB IN (SP0, C0) OUT (SP0) |
| 000014e9: MOVw EA, R ESP EBP | MVw IN (G4) OUT (G5) |
| 000014eb: LEAVE <TOS fbfffc3c> | ADD IN (G5, C0) OUT (G4) |
|  | LDw IN (G5, Memfbfffc3c) OUT (G5) |
| 000014ec: RETn | LDw IN (G4, Memfbfffc40) OUT (T0) |
|  | ADD IN (SP0, C0) OUT (SP0) |
|  | JMP IN (T0) OUT () |
| 00001625: XORw EA, R EDI EDI | XOR IN (G7, G7) OUT (G7) |
| 00001625: ADDw Ib, EA ESP <IMM 18> | ADD IN (G4) OUT (G4, flags 0) |

It can be seen that the PUSH of the BP register is converted into two micro operations. The first performs the store of the register and the second adjusts the stack pointer. These two micro operations are not dependent on each other. The "microcode" corresponding to the PUSH has been written explicitly to allow maximal parallelism wherever possible. It can be seen that some complex instructions translate into multiple micro operations which may or may not be related to one another, and simple instructions map directly into a unique micro operation (such as XOR or ADD).

Figure 2:
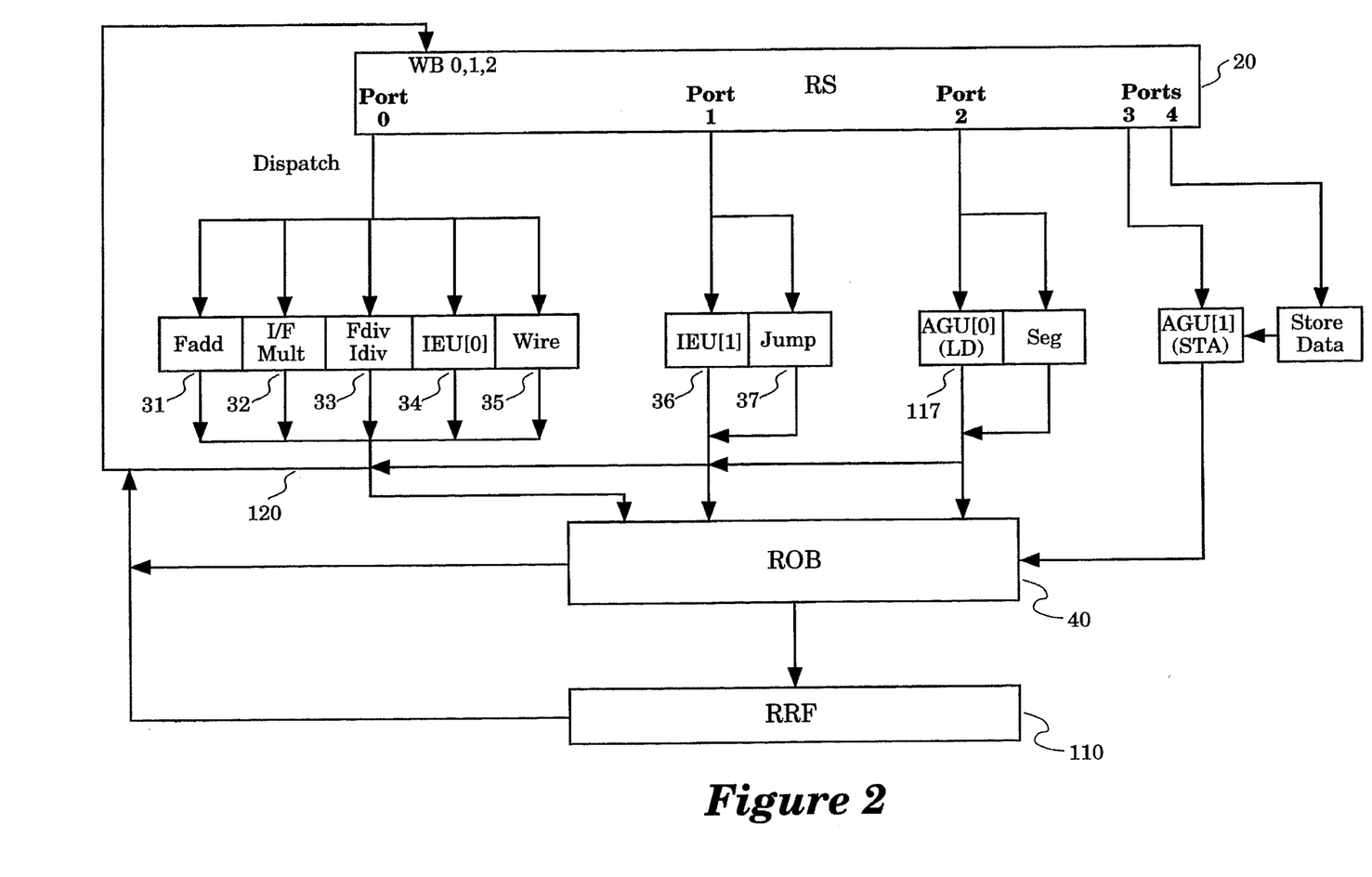
FIG. 2 illustrates a block diagram of a portion of a microprocessor incorporating the present invention.

FIG. 2 illustrates a portion of the microprocessor incorporating the present invention. The preferred embodiment microprocessor implements out-of-order execution. The portion of the microprocessor illustrated in FIG. 2 can be considered the out-of-order core of the microprocessor. The first element of the out-of-order core illustrated in FIG. 2 is the reservation station 20. The reservation station is a buffer in front of the functional units that holds micro operations that are waiting for needed resources in order to execute. These needed resources include the source data operands (that previous micro operations may not yet have created) and a functional unit with which to execute the micro operation.

The reservation station performs several functions. It serves as a buffer for instructions and for source data that is already available. This source data may have already been stored in the reservation station and be waiting for an instruction to act upon it. In other cases, the reservation station maintains decoded instructions and is "watching" all the result/writeback buses from all the execution interfaces "looking" for source data that it needs for its micro operations. When the watched-for data arrives on the result bus 120, the reservation station grabs it and writes it into the appropriate source data field.

Once all the source operands for a micro operation are in the reservation station, the reservation station determines when an appropriate execution unit is available and schedules the data ready micro operation for dispatch to an available execution unit. The reservation station 20 of FIG. 2 is illustrated having five dispatch ports. Primarily, micro operations in the embodiment illustrated will be dispatched over either Dispatch Port 0 or Dispatch Port 1.

In the preferred embodiment, there are five execution units coupled to Dispatch Port 0 from reservation station 20. These are the floating point add unit 31, the floating point and integer multiply unit 32, the floating point divide unit 33, integer execution unit 34, and a wire unit 35. As was described, the complex Intel Architecture Microprocessor instruction set is reduced to a simpler stream of micro operations. These micro operations, when they are data-ready, are operated on by the various execution units. Most applications heavily utilize the integer execution unit. Integer execution unit 34 is designed to be able to process data-ready micro operations in one clock cycle. It is therefore referred to as a single-cycle functional unit. The integer execution unit 34 receives an instruction code sequence and source operand data having a width of 32 bits per operand. The floating point execution units 31, 32 and 33 carry out more complicated tasks when they receive data-ready micro operations. These functional units receive source data operands having a width of 86 bits.

In the preferred embodiment, a floating point add instruction requires three clock cycles to execute, an integer multiply requires four clock cycles, and a floating point multiply instruction requires five clock cycles to execute. Floating point divides and square roots, which are both carried out by the floating point divide unit 33, have variable length latencies depending upon the precision required for their result. The wire unit 35 is a hybrid execution unit implemented in the preferred embodiment for various catch-all instructions. It is similar to a floating point unit in that its input stream takes 86-bit operands, but it is more like an integer execution unit in that it performs its operations in a single clock cycle.

Dispatch port 1 from reservation station 20 also has two execution units coupled to it. There is an integer execution unit 36 and a jump unit 37. The integer execution unit 36 may be identical to the execution unit 34, or it may have additional or different functionality. Two integer execution units are provided because of the high volume of integer micro operations common in most code thereby enhancing performance of the overall system. Of course, additional integer execution units may be provided in alternative architectures.

After an execution unit executes a micro operation, its result is propagated on a write back bus 120 to the reorder buffer 40 and back to the reservation station 20. The reorder buffer 40 serves as the place where the results of out-of-order operations are collected so that they can later be committed to machine state in strict von Neumann program order. Thus, the reorder buffer is where the out-of-order core reassembles the instruction stream into its original program order. At the same time that execution units write back to the reorder buffer 40, they simultaneously write back to the reservation station 20, because the result of an execution unit's operation may provide a source operand needed for the execution of another micro operation waiting in the reservation station.

As can be seen from FIG. 2, the five execution units from Dispatch Port 0 all use the same writeback path 120 to the reorder buffer and to the reservation station 20. This is where certain conflicts may develop and is the motivation for the present invention. A conflict develops where, for example, an integer multiply instruction and floating point add instruction are issued on consecutive clock cycles from the reservation station. Because the integer multiply executes in a four cycle pipeline and the floating point add unit has a three cycle pipeline, consecutively issued instructions to these two units creates a situation in which both desire to provide result data to the write back bus 120 simultaneously. This cannot be done. Similarly, if an integer instruction is dispatched to the integer execution unit 34 two clock cycles after a floating point add has been dispatched or three clock cycles after an integer multiply has been dispatched, the integer execution unit and the multiply unit will also both need to write back on the same clock cycle. This also cannot happen.

Figure 3:
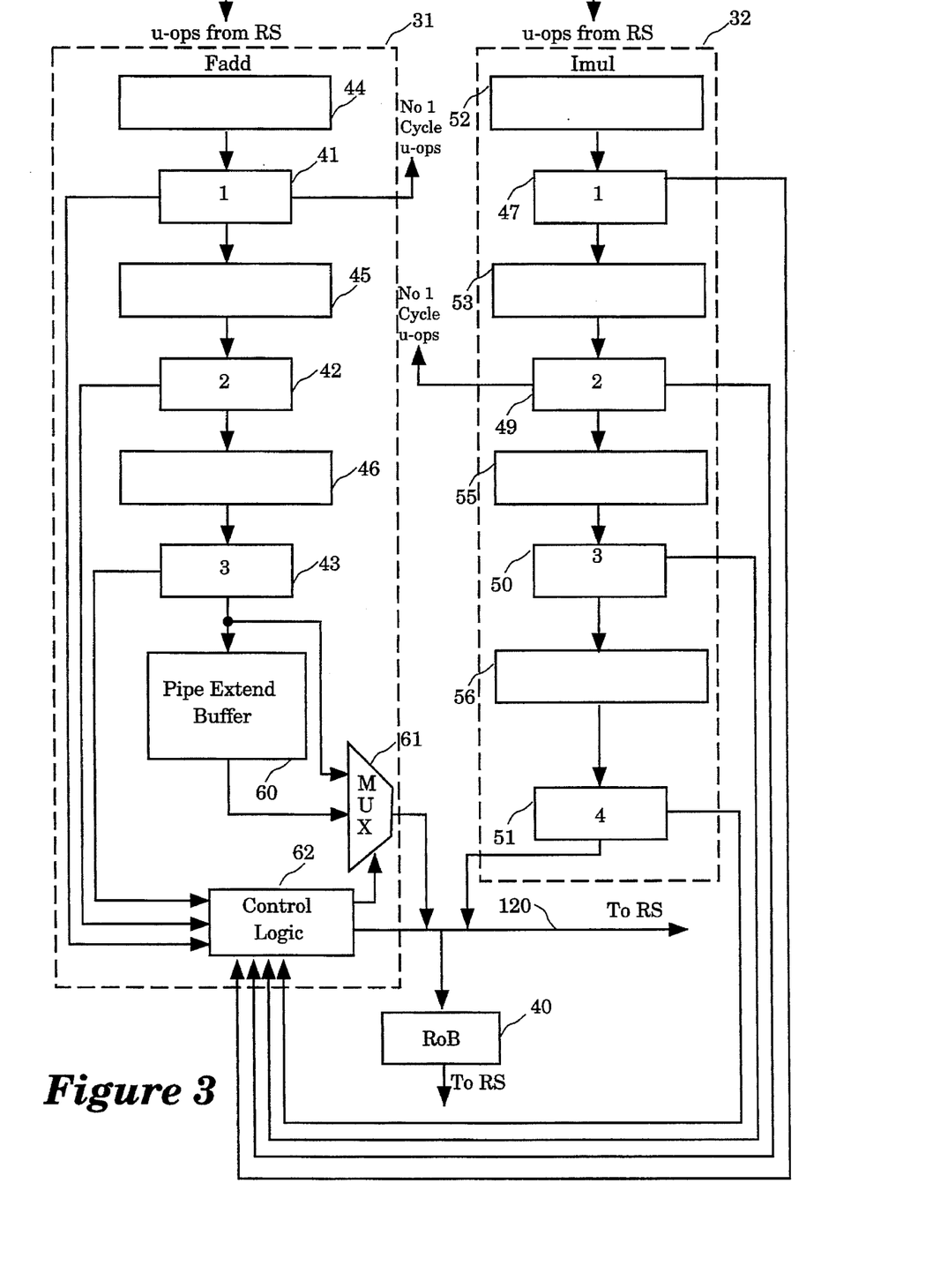
FIG. 3 illustrates a more detailed figure of the pipeline of two execution units sharing a common writeback port and the means for avoiding conflicting use of the writeback port.

FIG. 3 illustrates a more detailed view of two execution units coupled to write back to the reorder buffer 40 and reservation station 20 over writeback bus 120. The floating point add unit 31 and multiply unit 32, for example, receive data-ready micro operations from the reservation station. The floating point add unit 31 comprises a three-stage execution pipeline. Thus, though it requires three clock cycles to complete one micro operation, it may receive a micro operation every clock cycle and provide an output every clock cycle. The three stages of the pipeline are illustrated in FIG. 3 as the first stage functional circuit block 41, second stage functional circuit block 42 and third stage functional circuit block 43. At the front end of each stage of the execution unit pipeline are latches or registers for buffering the data stream into each functional stage. These are illustrated as latches 44, 45 and 46, respectively preceding the first, second and third floating point add pipeline stages.

Similarly, the integer portion of multiply functional unit 32 receives its micro operations from the reservation station, but has a four stage execution pipeline shown as first stage 47, second stage 49, third stage 50, and fourth stage 51. In front of each of these stages, respectively, are latches or buffers 52, 53, 55 and 56.

As was described above, when a dispatched integer multiply instruction is followed one clock cycle later by a dispatched floating point add instruction, both functional units will be ready to write back result data at the same time over the same writeback bus 120, a writeback contention. To avoid this, the pipeline of the floating point add functional unit 31 is conditionally extended by one clock cycle. A fourth latch or pipe extension buffer 60 receives the output from the third pipe stage 43 of the unit. Buffering the functional unit's result through a fourth buffer delays, by one clock cycle, the output of the unit. Thus, in the case where a floating point add has been dispatched one clock cycle after a floating point multiply, its result will need to be written back one clock cycle after the floating point multiply result is written by utilizing the pipe extending register. As an alternative to the pipe extension buffer 60, other one cycle buffering techniques may be implemented, such as a one cycle delay line.

To control the pipeline length of the floating point add unit 31, a multiplexing circuit 61 is implemented. The multiplexer circuitry 61 receives as input signals a result directly from the third pipe stage 43 of the floating point add unit and a previous clock cycle's buffered result from the pipeline extending buffer 60. The multiplexer 61 is controlled by control logic 62 which determines when the pipeline length of the floating point add unit should be extended. When the control logic 62 determines that a writeback conflict will exist, it instructs the multiplexer 61 to select the signal coming through the pipe extension buffer 60 to be the signal to be written back from the functional unit. When no writeback conflict exists and no writeback result is pending in the extension buffer 60, the control logic instructs the multiplexer 61 to select the output directly from the third pipe stage 43 of the floating point add unit.

In determining whether the floating point add unit should extend the functional unit's pipeline length, the control logic 62 measures the activity occurring at the different pipe stages of the floating point add and integer multiply functional units. The control logic 62 may implement comparing circuitry which determines that if a multiply is in multiply pipe stage 4 at the same time a floating point add is in the third pipe stage of that functional unit, then there will be a writeback conflict, and the floating point add unit needs to extend its pipeline length by one clock cycle. Other comparisons may be performed, so long as the comparison is designed to indicate that a writeback conflict will exist. Those of ordinary skill in the art will be able to implement the control logic 62 without undue experimentation for determining when a writeback conflict exists.

When no writeback conflict will exist after one has previously existed, the control logic 62 of the floating point add unit 31 will reset the length of the floating point add pipeline to be three clock cycles. If valid bits are implemented in the buffering elements, then the pipe extension buffer 60 will have its valid bit reset indicating a three clock-cycle pipeline.

The above discussion of lengthening a functional unit pipeline considered the case of a writeback conflict where two functional units have a one pipe stage pipeline length difference. It is of course possible for two functional units to have a pipeline length difference of more than one pipe stage. In order to optimally implement the present invention for such a case, the pipe extension buffer 60 needs to provide buffering for N deep entries where N is the difference in the number of pipeline stages of the conflicting functional units.

Figure 4:
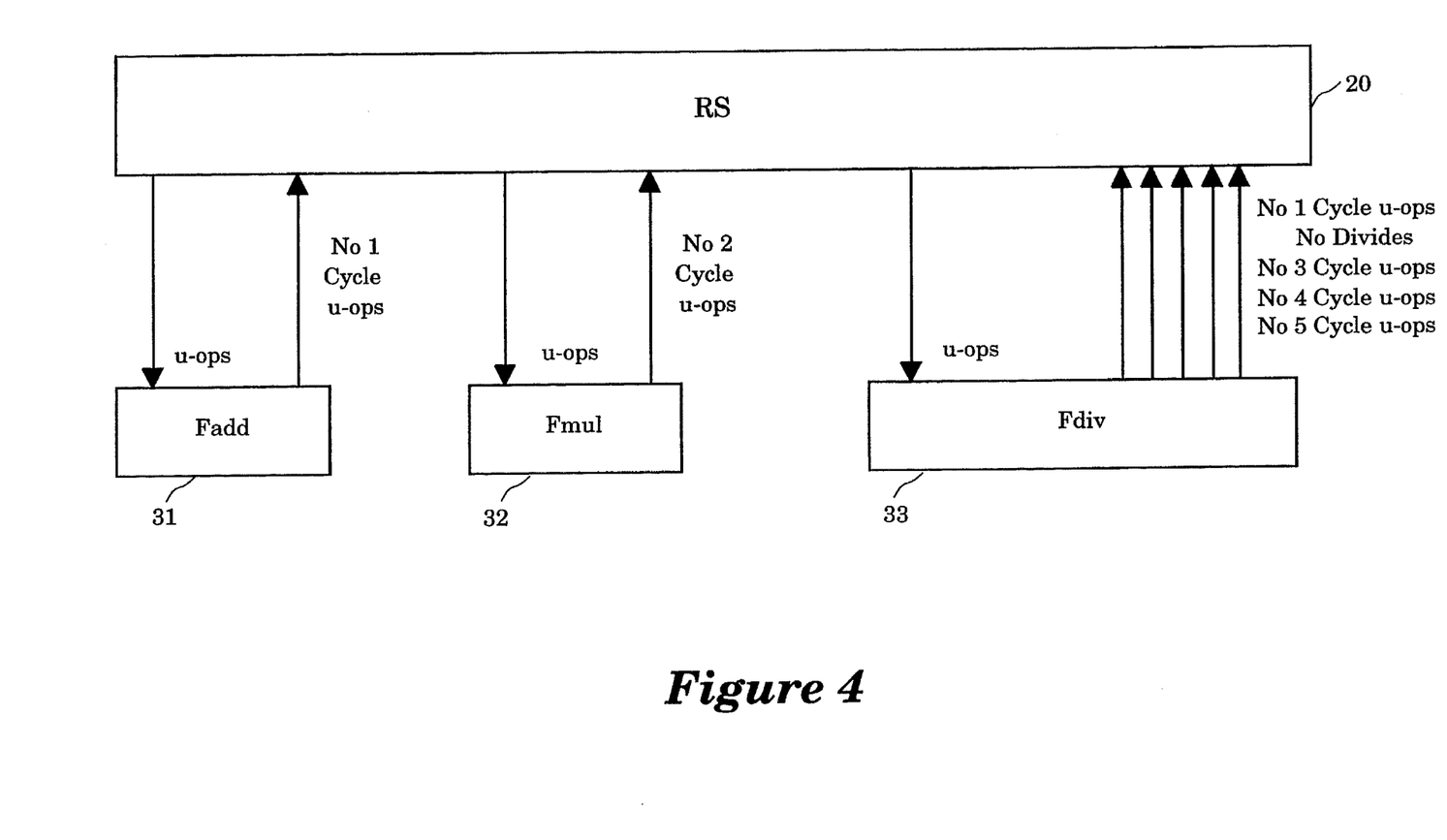
FIG. 4 illustrates execution units which signal a reservation station in order to inhibit the reservation station from dispatching instructions which will conflict with a need for a common writeback path.

Another aspect of the present invention will be described simultaneously with respect to FIGS. 2, 3 and 4. Other writeback conflicts can develop with respect to those execution units receiving their inputs from Dispatch Port 0 of the reservation station 20. There are two single-cycle execution units, the integer execution unit 34 and wire unit 35 (FIG. 2). If a micro operation is dispatched to either of these execution units when a floating point unit is at the final stage of its pipeline, both the single-cycle unit and the floating point unit will need to write back result data simultaneously. Thus, the reservation station 20 must be inhibited from dispatching single-cycle micro operations prior to when a floating point unit will want to write back its result data. The floating point units are therefore provided with a signal path to the reservation station 20 for signaling that certain types of operations should not be dispatched for one clock cycle. The logic in the reservation station receives these signals and considers them in performing its scheduling algorithms. Because the reservation station of the preferred embodiment requires a two clock-cycle pipeline for the scheduling of micro operations, the reservation station needs to receive the inhibit signal at least two clock cycles prior to the dispatch of any micro operations to be inhibited.

The first stage 41 of the floating point add functional unit 31, upon receiving a floating point add instruction, signals the reservation station not to issue any single-cycle micro operations. This prevents the reservation station from issuing a single-cycle micro operation to either integer execution unit 34 or the wire unit 35 two cycles later which would then be attempting to write back result data at the same time as the floating point add result was being written back. Likewise, the second pipeline stage 49 of the multiply functional unit 32 signals the reservation station 20 not to issue any single-cycle micro operations two cycles later which would result in the same writeback conflict with that unit.

One more floating point unit must be considered in the cluster receiving micro operations from Dispatch Port 0. The floating point divide unit performs both floating point division and square root functions. This functional unit in the preferred embodiment is not pipelined. Floating point divides and square roots can have very long latencies, up to and including fifty to sixty clock cycles. While one operation is being performed therein, no other micro operations may be dispatched to this functional unit 33. Accordingly, the floating point divide unit upon receiving a micro operation signals the reservation station 20 to inhibit the dispatch of any subsequent micro operations to it until the floating point divide unit 33 has performed its result writeback. Alternatively, upon dispatching a divide, the reservation station logic may be designed to self-inhibit back-to-back divides. In addition, the floating point divide unit is capable of determining the number of clock cycles it will require for performing a received micro operation. With this information, the floating point divide unit 33 signals three cycles before writeback that no one cycle micro operations should be issued from the reservation station 20. Likewise, five, six and seven clock cycles prior to writeback, the floating point divide unit 33 signals that no three cycle, four or five cycle micro operations should be dispatched from the reservation station 20, respectively. It should be understood that when the reservation station is inhibited from dispatching only one class of micro operation (i.e., a three cycle floating point add), others may still be dispatched (i.e., single cycle operations or longer multiply operations).

The implementation of both the pipe lengthening of the floating point add unit and the inhibiting of the reservation station from issuing certain conflicting micro operations eliminates the potential problem of a writeback conflict by execution units sharing a common writeback path. The preferred embodiment of the present invention has been described as being implemented in an out-of-order executing microprocessor. The present invention may, however, be implemented by any processor in which the above-described writeback conflicts exist. Although the present invention has been described in terms of preferred and implemented embodiments, it will be appreciated that various modifications and alterations might be made by those skilled in the art without departing from the spirit and scope of the present invention. The invention should, therefore, be measured in terms of the claims which follow.

What is claimed is:

1. An apparatus for extending the length of time required for execution of an instruction in a pipelined execution unit comprising:

first and second execution units wherein said first execution unit shares a writeback path with said second execution unit, said first execution unit having at least a final pipeline stage, said second execution unit having a pipeline having at least one stage more than said first execution unit, wherein said instruction remains in each pipeline stage for one clock cycle and comprises one pipeline stage duration;

a result buffering element coupled to said final pipeline stage of said first execution unit for delaying write back of a result of said first execution unit for a predetermined number of pipeline stage durations;

multiplexing logic coupled to said result buffering element and to said final pipeline stage of said first execution unit, said result buffering element providing a first input to said multiplexing logic and said final pipeline stage of said first execution unit providing a second input to said multiplexing logic, said multiplexing logic providing an output to said writeback path; and writeback conflict detect logic coupled to said first and second execution units for detecting if said execution units will encounter a writeback conflict, said writeback conflict detect means being coupled to said multiplexing logic for providing a control signal to said multiplexing logic for selecting one of said first or second inputs to be the output provided to said writeback path.

2. The apparatus of claim 1 wherein said result buffering element comprises a register coupled to receive the output of said final pipeline stage of said first execution unit, wherein said predetermined number of pipeline stage durations comprises one pipeline stage duration.

3. The apparatus of claim 2 wherein said multiplexing logic comprises multiplexer logic which receives as input the contents of said register and the output of said final pipeline stage of said first execution unit.

4. The apparatus of claim 3 wherein said writeback conflict detect logic comprises comparing logic coupled to said first and second execution units for comparing the pipeline activity of said execution units to determine if said execution units will simultaneously write to said writeback path, said comparing logic providing a control signal to said multiplexer logic for selecting the input from said register to avoid a detected writeback conflict.

5. The apparatus of claim 1 further comprising a third execution unit and a reservation station coupled to the first, second and third execution units, said reservation station having a multiple (n)-cycle scheduling pipeline, said first execution unit having a multiple (m)-cycle pipeline, said reservation station requiring only a single cycle to execute dispatched instructions, said third execution unit sharing said common writeback path with said first execution unit, said first execution unit further comprising means for signaling said reservation station to delay scheduling instructions for dispatch to said third execution unit to avoid a writeback conflict between said first and third execution units.

6. The apparatus of claim 1 further comprising a reservation station coupled to the first and second execution units, said reservation station having a multiple (n)-cycle scheduling pipeline, said second execution unit having a multiple (m)-cycle pipeline, the apparatus further comprising a third execution unit, said reservation station further being coupled to the third execution unit requiring only a single cycle to execute dispatched instructions, said third execution unit sharing said common writeback path with said second execution unit, said second execution unit further comprising means for signaling said reservation station to delay scheduling instructions for dispatch to said third execution unit to avoid a writeback conflict between said second and third execution units.

7. The apparatus of claim 6 wherein said second execution unit signals said reservation station at the (m−n)th stage of the pipeline of said second execution unit.

8. The apparatus of claim 1 wherein said first execution unit requires multiple (N) pipe stages to complete instruction execution and said second execution unit requires multiple (M) pipe stages to complete instruction execution where M is greater than N, said result buffering element comprising an (MN) buffer depth.

9. The apparatus of claim 8 wherein (M–N) is greater than one (1).

10. The apparatus of claim 1 wherein said first execution unit comprises a floating point add unit having a three cycle pipeline and said second execution unit comprises an integer multiply unit having a four cycle pipeline.

11. An apparatus for extending the length of an instruction execution pipeline comprising:

first and second execution units wherein said first execution unit shares a writeback path with said second execution unit, said first execution unit having at least a final pipeline stage, said second execution unit having a pipeline having at least one stage more than said first execution unit, wherein said instruction remains in each pipeline stage for one clock cycle and comprises one pipeline stage duration;

a storage register coupled to said final pipeline stage of said first execution unit for latching the result of said first execution unit for a single pipeline stage duration cycle;

a multiplexer coupled to said storage register and to said final pipeline stage of said first execution unit, said storage register providing a first input to said multiplexer and said final pipeline stage of said first execution unit providing a second input to said multiplexer, said multiplexer providing an output to said writeback path; and comparing logic coupled to said first and second execution units for detecting if said execution units will encounter a writeback conflict, said comparing logic being coupled to said multiplexer for providing a control signal to said multiplexer for selecting one of said first or second inputs to be the output provided to said writeback path.

12. The apparatus of claim 11 further comprising a reservation station coupled to the first and second execution units, said reservation station having a multiple (n)-cycle scheduling pipeline, said second execution unit having multiple (m)-cycle pipeline, the apparatus further comprising a third execution unit, said reservation station further being coupled to the third execution unit requiring only a single cycle to execute dispatched instructions, said third execution unit sharing said common writeback path with said second execution unit, said second execution unit further comprising means for signaling said reservation station to delay scheduling instructions for dispatch to said third execution unit to avoid a writeback conflict between said second and third execution units.

13. The apparatus of claim 12 wherein said second execution unit signals said reservation station at the (m–n)th stage of the pipeline of said second execution unit.

14. The apparatus of claim 11 wherein said first execution unit comprises a floating point add unit having a three cycle pipeline and said second execution unit comprises an integer multiply unit having a four cycle pipeline.

15. A method of avoiding writeback conflicts for use in a microprocessor having at least first and second execution units which share a common writeback path, said first execution unit having at least a final pipeline stage and said second execution unit having a pipeline having at least one stage more than said pipeline of said first execution unit wherein an instruction to be executed remains in each pipeline stage for one pipeline stage duration, the method of avoiding writeback conflicts between said first and second execution units comprising the steps of:

providing said first execution unit with an additional buffer for delaying the output of said first execution unit, said additional buffer receiving the result from said final pipeline stage of said first execution unit;

comparing the pipeline activity of said first and second execution units to determine if both will attempt to use the common writeback path simultaneously;

buffering the result from said first execution unit through said additional buffer for a predetermined number of cycles when there would otherwise be a writeback conflict between said first and second execution units;

providing a multiplexer with the result from the final pipeline stage of said first execution unit;

simultaneously providing said multiplexer with the buffered result; and selecting the appropriate signal from said multiplexer to write back over said common writeback path to avoid a writeback conflict.

16. A method of avoiding writeback conflicts for use in a microprocessor having at least first and second execution units which share a common writeback path, said first execution unit having at least a final pipeline stage and said second execution unit having a pipeline having at least one stage more than said pipeline of said first execution unit wherein an instruction to be executed remains in each pipeline stage for one pipeline stage duration, and wherein said first and second execution units receive instructions from a reservation station having an n-cycle scheduling pipeline, said first execution unit having an m-cycle execution pipeline, said reservation station being further coupled to a third execution unit requiring only a single cycle to execute instructions, the method of avoiding writeback conflicts comprising the steps of:

providing said first execution unit with an additional buffer for delaying the output of said first execution unit, said additional buffer receiving the result from said final pipeline stage of said first execution unit;

comparing the pipeline activity of said first and second execution units to determine if both will attempt to use the common writeback path simultaneously;

buffering the result from said first execution unit through said additional buffer for a predetermined number of cycles when there would otherwise be a writeback conflict between said first and second execution units; and said first execution unit, during the (m–n)th stage of its pipeline, signaling said reservation station not to dispatch any single cycle instruction.

17. The method of claim 16 wherein said microprocessor further comprises a fourth execution unit coupled to said reservation station and to said common writeback path, said fourth execution unit not being pipelined, the method comprising the steps of:

said fourth execution unit signaling said reservation station not to dispatch any instructions to said fourth execution unit until it has written a result over said write back path;

determining the number of clock cycles (X) that said fourth execution unit requires to carry out an instruction;

said fourth execution unit, during the (X–n)th cycle of execution signaling said reservation station not to dispatch any single cycle instructions; and said fourth execution unit, during the (X–(m+n))th cycle of execution signaling said reservation station not to dispatch any m-cycle instructions.

18. A computer system comprising:

an input/output (I/O) means for providing a communications interface;

a memory means coupled to said I/O means for storing instructions and computer data;

data input means coupled to said I/O means for providing data input and data output to interface with a computer user; and microprocessor means coupled to said I/O means for executing instructions and processing computer data, said microprocessor means further comprising a means for extending the length of a pipeline of a first execution unit for an additional clock cycle wherein said first execution unit shares a writeback path with a second execution unit, said first execution unit having at least a final pipeline stage, said second execution unit having a pipeline having at least one stage more than said first execution unit, said means for extending the length of a pipeline comprising:

buffering means coupled to said final pipeline stage of said first execution unit for delaying the result writeback from said first execution unit;

multiplexing means coupled to said buffering means and to said final pipeline stage of said first execution unit, said buffering means providing a first input to said multiplexing means and said final pipeline stage of said first execution unit providing a second input to said multiplexing means, said multiplexing means providing an output to said writeback path; and writeback conflict detect means coupled to said first and second execution units for detecting if said execution units will encounter a writeback conflict, said writeback conflict detect means being coupled to said multiplexing means for providing a control signal to said multiplexing means for selecting one of said first or second inputs to be the output provided to said writeback path.

19. The computer system of claim 18 wherein said first and second execution units are coupled to a reservation station, said reservation station having an n-cycle scheduling pipeline, said second execution unit having an m-cycle pipeline, said reservation station further being coupled to at least a third execution unit requiring only a single cycle to execute dispatched instructions, said third execution unit sharing said common writeback path with said second execution unit, said second execution unit further comprising means for signaling said reservation station to delay scheduling instructions for dispatch to said third execution unit to avoid a writeback conflict between said second and third execution units.

20. The computer system of claim 19 wherein said second execution unit signals said reservation station at the (m−n)th stage of the pipeline of said second execution unit.

21. The computer system of claim 18 wherein said first execution unit has a pipeline length of N pipe stages and said second execution unit has a pipeline length of M pipe stages where M is greater than N, said buffering means comprising an (M−N) buffer depth.

22. The computer system of claim 21 wherein (M−N) is greater than one (1).

23. The computer system of claim 18 wherein said first execution unit comprises a floating point add unit having a three cycle pipeline and said second execution unit comprises an integer multiply unit having a four cycle pipeline.

24. In a processor having first and second execution units coupled to receive instructions from, and write results back to, a common unit, the first execution unit having a final pipeline stage providing a first result during a given pipeline cycle, the second execution unit having at least one more pipeline stage than the first execution unit and including a final pipeline stage, the improvement comprising:

an extra pipeline stage coupled to receive the first result and to provide it as a delayed result during a subsequent pipeline cycle;

a multiplexer coupled to receive the first result and the delayed result, and coupled to the common unit; and write back conflict detection logic coupled to the first and second execution units and to the multiplexer, to cause the multiplexer to select the delayed result for writeback to the common unit during the subsequent pipeline cycle if, in the given pipeline cycle, the final stages of both the first and second execution units will output results, and otherwise to write the first result back to the common unit during the given pipeline cycle.

\* \* \* \* \*

UNITED STATES PATENT AND TRADEMARK OFFICE
CERTIFICATE OF CORRECTION

| | | |
|---|---|---|
| PATENT NO. | : | 5,604,878 |
| DATED | : | February 18, 1997 |
| INVENTOR(S) | : | Colwell et al. |

It is certified that error appears in the above-identified patent and that said Letters Patent is hereby corrected as shown below:

In column 6 at line 52 delete "yon Neumann" and insert --von Neumann--

In column 10 at line 67 delete "(MN)" and insert --(M-N)--

In column 11 at lines 38-39 insert --a-- following "having" and prior to "multiple"

Signed and Sealed this

Twenty-sixth Day of August, 1997

Attest:

BRUCE LEHMAN

Attesting Officer     Commissioner of Patents and Trademarks